US012572911B2

(12) United States Patent
Li et al.

(10) Patent No.: US 12,572,911 B2
(45) Date of Patent: Mar. 10, 2026

(54) PREDICTING ITEM WEIGHTS USING A TRAINED MACHINE LEARNING MODEL

(71) Applicant: Maplebear Inc., San Francisco, CA (US)

(72) Inventors: Aoshi Li, Toronto (CA); Prithvishankar Srinivasan, Seattle, WA (US); Shang Li, Jersey City, NJ (US); Mengyu Zhang, Newton, MA (US); Daniel Haugh, San Francisco, CA (US); Cheryl D'Souza, Columbus, OH (US); Syed Wasi Hasan Rizvi, Toronto (CA); William Halbach, Seattle, WA (US); Ziwei Shi, San Francisco, CA (US); Annie Zhang, Gardena, CA (US); Giovanny Castro, Austin, TX (US); Sonali Parthasarathy, Fremont, CA (US); Shishir Kumar Prasad, Fremont, CA (US)

(73) Assignee: Maplebear Inc., San Francisco, CA (US)

( * ) Notice: Subject to any disclaimer, the term of this patent is extended or adjusted under 35 U.S.C. 154(b) by 209 days.

(21) Appl. No.: 18/240,719

(22) Filed: Aug. 31, 2023

(65) Prior Publication Data

US 2025/0078056 A1     Mar. 6, 2025

(51) Int. Cl.
*G06Q 30/00* (2023.01)
*G06Q 10/087* (2023.01)
*G06Q 20/14* (2012.01)
*G06Q 30/0601* (2023.01)

(52) U.S. Cl.
CPC ......... *G06Q 20/145* (2013.01); *G06Q 10/087* (2013.01); *G06Q 30/0603* (2013.01)

(58) Field of Classification Search
CPC .................................................. G06Q 20/145
USPC ......... 705/40, 1.1, 29, 28, 14.52, 7.31, 26.1; 382/159
See application file for complete search history.

(56) References Cited

U.S. PATENT DOCUMENTS

| | | | | |
|---|---|---|---|---|
| 12,033,109 | B1 * | 7/2024 | Wang .................. | G06Q 10/0835 |
| 2023/0351184 | A1 * | 11/2023 | Di Fabbrizio ...... | G06F 18/2155 |
| 2024/0289857 | A1 * | 8/2024 | Maharaj ............. | G06Q 30/0631 |

OTHER PUBLICATIONS ip.com NPL Search History.*

* cited by examiner

*Primary Examiner* — John H. Holly
(74) *Attorney, Agent, or Firm* — Fenwick & West LLP

(57)     ABSTRACT

An online concierge system compensates pickers who fulfill orders including one or more items based in part on weights of the items included in an order. Because the online concierge system does not physically possess the items that are obtained, the online concierge system cannot directly weigh the items and weights specified for items in a catalog from a retailer may be inaccurate. To more accurately determine weights of items, the online concierge system trains a weight prediction model to estimate an item's weight from attributes of the item and uses the output of the weight prediction model to determine compensation to a picker. The weight prediction model may output a predicted weight of an item or a classification of the item as heavy or light. Where discrepancies are found between a predicted weight and the catalog weight of an item, additional information about the item is obtained.

20 Claims, 4 Drawing Sheets

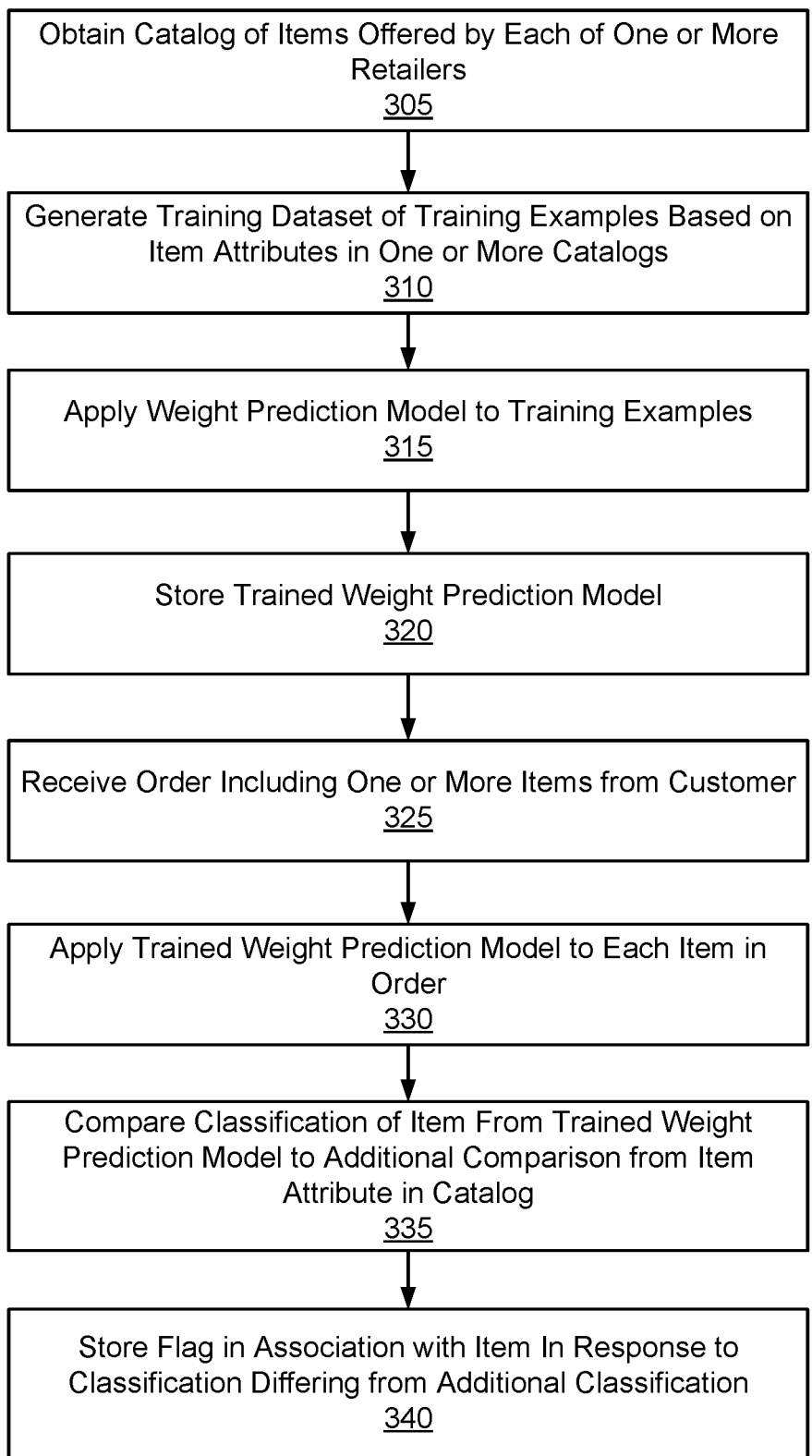

Obtain Catalog of Items Offered by Each of One or More
Retailers
305

Generate Training Dataset of Training Examples Based on
Item Attributes in One or More Catalogs
310

Apply Weight Prediction Model to Training Examples
315

Store Trained Weight Prediction Model
320

Receive Order Including One or More Items from Customer
325

Apply Trained Weight Prediction Model to Each Item in
Order
330

Compare Classification of Item From Trained Weight
Prediction Model to Additional Comparison from Item
Attribute in Catalog
335

Store Flag in Association with Item In Response to
Classification Differing from Additional Classification
340

FIG. 3

PREDICTING ITEM WEIGHTS USING A TRAINED MACHINE LEARNING MODEL

BACKGROUND

Online concierge systems receive orders for items from customers and provide an order to a picker (or a shopper), who fulfills the order. To fulfill an order from a customer, a picker to whom the order was provided obtains items in the order from a retailer. The picker subsequently delivers the obtained items to the customer from whom the order was received.

Various online concierge systems account for item attributes of items in an order when compensating a picker for fulfilling the order. For example, an online concierge system accounts for an aggregate weight of items in an order when compensating a picker for fulfilling the order. This allows compensation to a picker to account for potential difficulty in fulfilling different orders. Various online concierge systems compare item weights to a threshold weight and increase compensation to a picker for orders including items with weights exceeding the threshold weight.

As pickers obtain items from a retailer to fulfill an order, an online concierge system does not physically possess items included in orders. Without physically possessing items, the online concierge system cannot weigh various items to determine whether the weight of the item exceeds the threshold weight. As attributes of an item, such as an item's weight, are provided to the online concierge system by a retailer, inaccuracies in an item's weight received from a retailer affect the compensation provided by the online concierge system to a picker. For example, classifying an item with greater than a threshold weight as a light item could potentially result in under-compensation of pickers, negatively affecting their morale. Conversely, classifying an item with less than the threshold weight as a heavy item could result in over-compensation of pickers, increasing costs incurred by the online concierge system for order fulfillment. As the online concierge system does not physically possess items, conventional online concierge systems are unable to identify inaccuracy in an item's weight from the retailer and to compensate for inaccurate item weights received from a retailer when determining how to compensate pickers.

SUMMARY

In accordance with one or more aspects of the disclosure, an online concierge system obtains a catalog from one or more retailers. A catalog received from a retailer includes multiple entries, with each entry corresponding to a different item. An entry in the catalog includes an item identifier of an item and one or more item attributes of the item. Example item attributes of an item include: one or more keywords, a brand offering the item, a manufacturer of the item, a type of the item, a price of the item, a quantity of the item, a size of the item, a weight of the item, and other descriptive information of the item. Further, one or more item attributes for an item are determined by the online concierge system and stored in the catalog by the online concierge system. For example, the online concierge system determines one or more categories or sub-categories for an item and stores the categories or sub-categories in an entry in the catalog corresponding to the item.

The online concierge system receives orders from customers, which are fulfilled by one or more pickers. For example, the online concierge system receives a selection of a retailer from a customer and retrieves a catalog corresponding to the selected retailer. The online concierge system identifies items from the catalog to the customer to allow the customer to create an order. Each order includes one or more items and identifies the retailer from which the items are to be obtained. A picker selects an order for fulfillment, obtains items included in the order from the retailer identified by the order, and delivers the obtained items to a location of the customer to fulfill the selected order.

The online concierge system compensates a picker for fulfilling an order and accounts for weights of items included in the when determining an amount of compensation received by the picker. For example, the online concierge system determines an aggregate weight of items, or of a subset of items, included in an order and determines the amount of compensation to a picker based on the aggregate weight. In some embodiments, the online concierge system maintains a threshold weight and compares an item's weight from the catalog for the retailer to the threshold weight. The online concierge system classifies an item with a weight less than the threshold weight as light and classifies an item with a weight greater than (or equal to or greater than) the threshold weight as heavy. For items classified as heavy, the online concierge system increases an amount of compensation to a picker relative to items classified as light. For example, the online concierge system determines compensation to a picker as a percentage of an aggregate weight of items in an order classified as heavy.

However, pickers obtain items for an order from a retailer identified in an order rather than from the online concierge system. As, the online concierge system does not physically possess items included in orders, the online concierge system leverages the catalog obtained for a retailer to determine item attributes of various items, such as weights of items, affecting compensation provided to a picker. Hence, conventional online concierge systems retrieve weights of items from a catalog for a retailer and use the retrieved weights to determine whether items are heavy or light when determining compensation to a picker. However, the catalog obtained for the retailer may not include weights for one or more items or may include inaccurate weights for one or more items. Inaccurate weight information in the catalog may cause the online concierge system to inaccurately determine compensation for a picker fulfilling an order. For example, the catalog for the retailer includes a weight for an item causing classification as a light item, while an actual weight of the item exceeds the threshold weight, resulting in under-compensation of a picker that reduces a likelihood of the picker fulfilling additional orders. Conversely, the catalog for the retailer includes a weight for an item callusing classification as a heavy item, while the actual weight of the item is less than the threshold weight, resulting in over-compensation of a picker that increases an overall cost incurred by the online concierge system for order fulfillment.

To mitigate discrepancies between a weight of an item included in the catalog and a physical weight of an item, the online concierge system trains a weight prediction model based on training examples generated from catalogs associated with one or more retailers. Each training example corresponds to an item for which a catalog includes a weight. A training example includes a set of item attributes of a training item from the catalog, with a label applied to the training example. In some embodiments, the label applied to a training example indicates whether a weight of the training item from the catalog is less than a threshold weight, so the label has a first value if the weight of the training item from the catalog equals or exceeds the threshold weight and has a second, different, value if the weight of the training item from the catalog is less than the threshold weight. Alternatively, the label applied to a training example is a weight of the training item determined from the catalog. In various embodiments, the online concierge system generates training examples from entries in catalogs for multiple retailers. For example, the online concierge system generates a training example for each item having a stored weight in at least one catalog.

The online concierge system applies the weight prediction model to each of a set of training examples. In some embodiments, the online concierge system 140 applies the weight prediction model to each generated training example to train the weight prediction model. The training process for the weight prediction model may include: applying the weight prediction model to a training example, comparing an output of the weight prediction model to the label associated with the training example, and updating weights comprising the weight prediction model through a back-propagation process. After application to training examples, the weight prediction module outputs a classification whether a weight of an item is less than the threshold weight based on a set of item attributes of the item in some embodiments. Alternatively, after training, the weight prediction model outputs a predicted weight of an item based on a set of item attributes of the item. Training the weight prediction model on items for which a weight is stored in one or more catalogs allows the weight prediction model to predict weights that align with attributes of items that the weight prediction model receives as input based on other items with similar attributes. After training, the online concierge system stores the trained weight prediction model for subsequent application.

After storing the trained weight prediction model, the online concierge system receives an order from a customer. The order includes one or more items and identifies a retailer from which the one or more items are to be obtained. Additionally, the order includes a location for delivery of the one or more items and a time interval for delivery of the one or more items in various embodiments. To determine compensation for a picker who fulfills the order, the online concierge system applies the trained weight prediction model to each item included in the order. Based on the output of the trained weight prediction model for each item included in the order, the online concierge system determines an amount of compensation for the picker fulfilling the order.

In various embodiments, the trained weight prediction model outputs a classification for each item in the order. The classification for an item indicates whether a weight of the item equals or exceeds a threshold weight (i.e., the item is heavy) or is less than the threshold weight (i.e., the item is light). The online concierge system determines the amount of compensation for a picker as a percentage of the aggregated weight of items in the order with weights equaling or exceeding the threshold weight. For example, the amount of compensation is a percentage of the aggregated weight of items in the order with weights equaling or exceeding the threshold weight. Alternatively, the trained weight prediction model outputs a predicted weight for each item in the order. The online concierge system compares the predicted weight of each item to the threshold weight and determines compensation to the picker from an aggregated weight of items with predicted weights equaling or exceeding the threshold weight, as further described above.

Additionally, the online concierge system compares a classification of an item in the order to an additional classification of the item from a weight stored for the item in the catalog for the retailer. In response to the classification of the item in the order from the weight prediction model differing from the additional classification of the item from a weight stored for the item in the catalog, the online concierge system stores a flag in association with the item. For an item with an associated flag, a reviewing user of the online concierge system obtains additional information about the item to resolve the difference in classification from the trained weight prediction model and the additional classification from the catalog. In various embodiments, the reviewing user accesses one or more third party systems to obtain additional information about the weight of the item and may update the attribute specifying the weight of the item in the catalog based on the information from the one or more third party systems. For example, the reviewing user obtains one or more physical characteristics, such as density, of the item and determines a physical weight from the one or more physical characteristics. As another example, a reviewing user obtains the item and manually determines the weight of the item, then updates the attribute specifying the weight of the item in the catalog based on the manual weighing. Storing a flag in association with an item for which the trained weight prediction model results in a different classification than a classification from a weight of the item in the catalog allows the online concierge system to update the catalog with a more accurate weight of the item (or to further refine the weight prediction model). Maintaining a more accurate weight for the item allows the online concierge system to more accurately determine compensation to a picker for additional orders including the item, increasing a likelihood of the picker fulfilling subsequent orders while preventing overcompensation of pickers for obtaining the item.

BRIEF DESCRIPTION OF THE DRAWINGS

FIG. 3 is a flowchart of a method for classifying a weight of an item offered by a retailer through a trained weight prediction model, in accordance with one or more embodiments.

DETAILED DESCRIPTION

Figure 1:
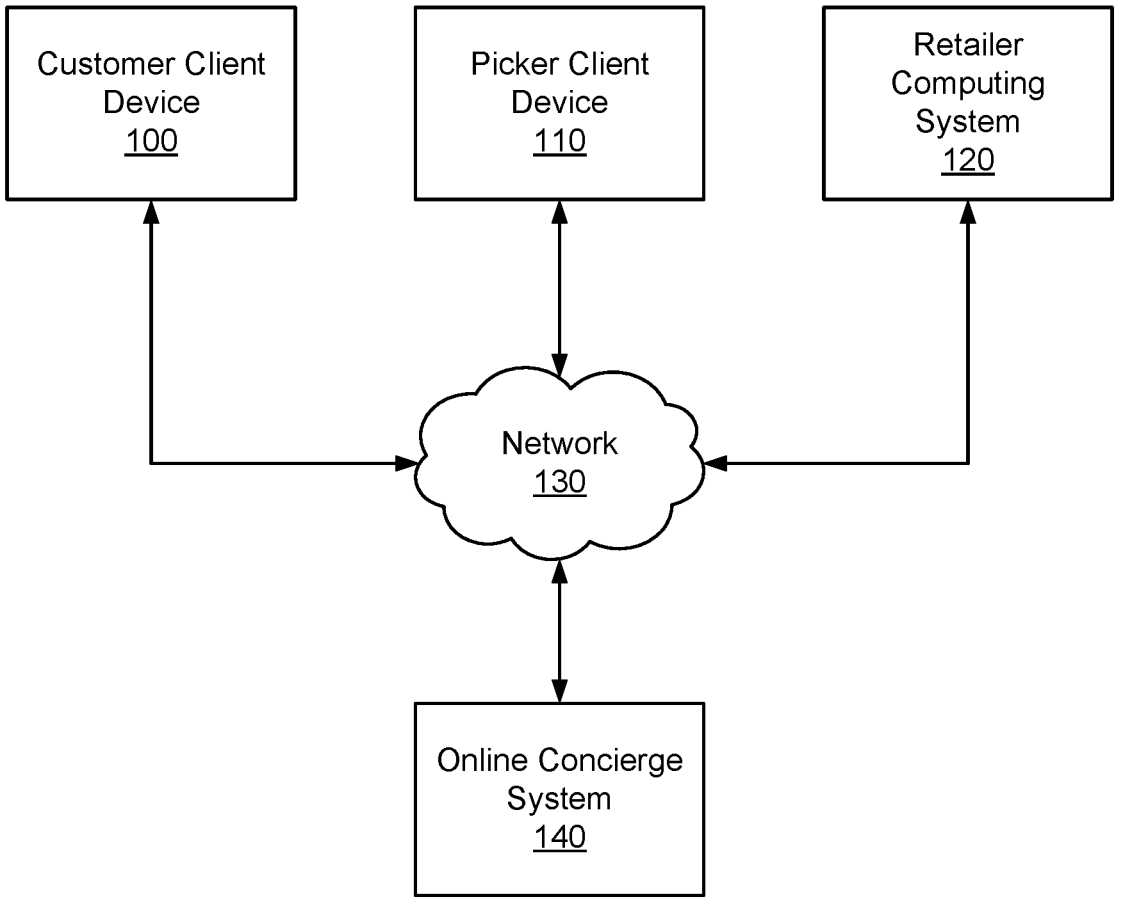
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
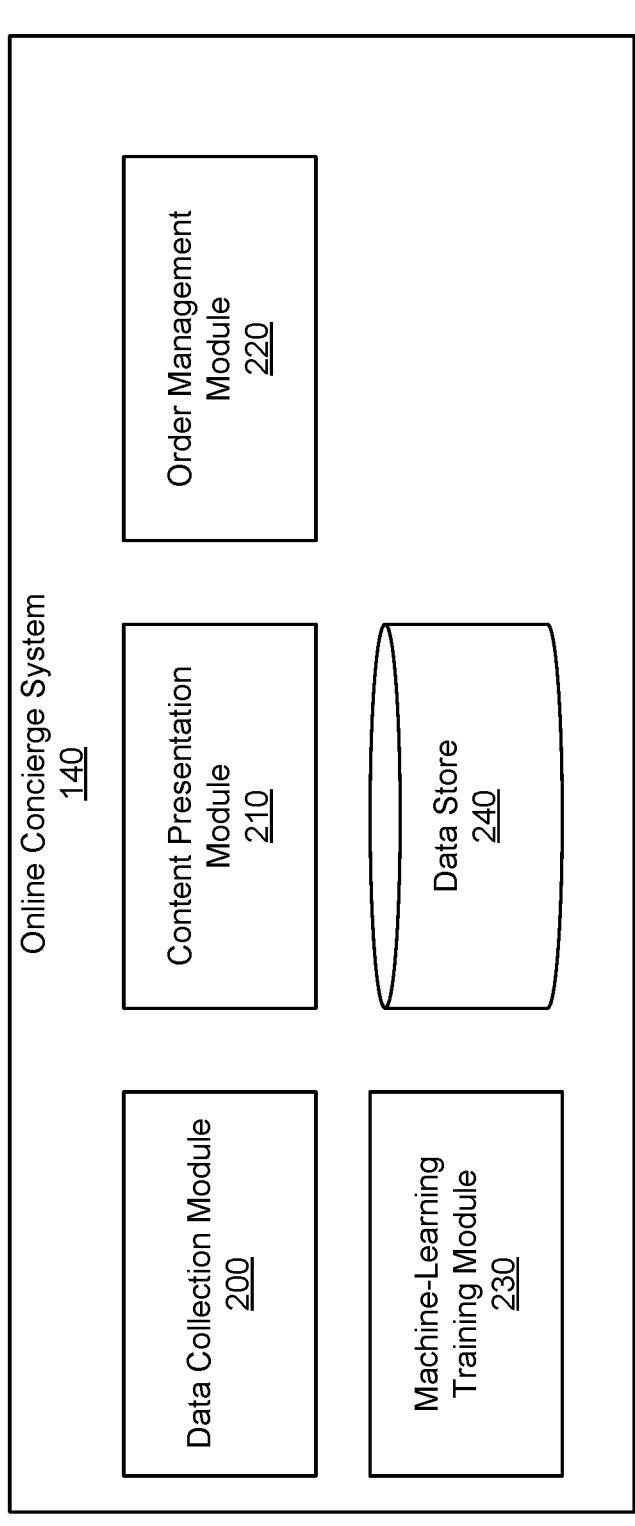
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include item attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location.

The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

In various embodiments, the machine-learning training module 230 trains and maintains a weight prediction model. As further described below in conjunction with FIGS. 3 and 4, the weight prediction model receives as input a set of item attributes of an item and outputs a classification whether the weight of the item is less than a threshold weight, or outputs a predicted weight of the item. The weight prediction model is trained using item attributes of items for which at least one catalog includes a weight, as further described below in conjunction with FIGS. 3 and 4. Training the weight prediction model based on item attributes of items for which a weight is stored allows the weight prediction model to leverage item attributes of the items with stored weights to predict or to infer weights of other items with similar attributes. As further described below in conjunction with FIGS. 3 and 4, after training the weight prediction model, the order management module 220 uses the weight prediction model to determine an amount of compensation to a picker fulfilling an order by applying the weight prediction model to each item included in an order. Additionally, the order management module 220 or the data collection module 200 obtains additional information about an item in response to a classification of whether the weight of the item is less than the threshold weight by the weight prediction model differing from an additional classification of whether the weight of the item is less than the threshold weight based on a stored weight in a catalog for the item. This allows the catalog to be updated based on the additional information to increase an accuracy of the weight of the item stored in the catalog, as further described below in conjunction with FIGS. 3 and 4.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

FIG. 3 is a flowchart of a method for classifying a weight of an item offered by a retailer through a trained weight prediction model, in accordance with one or more embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system 140 obtains 305 a catalog of items offered by each of one or more retailers. In various embodiments, the online concierge system 140 transmits a request to a retailer for a catalog of items offered by the retailer. The retailer transmits a catalog including information identifying items offered by the retailer and item attributes of each of the items to the online concierge system 140 in response to the request. The online concierge system 140 stores the received catalog in association with an identifier of the retailer in a data store 240, as further described above in conjunction with FIG. 2. In various embodiments, the catalog includes multiple entries, with each entry corresponding to a different item. An entry in the catalog includes an item identifier of the item and one or more item attributes of the item. Example item attributes of an item include: one or more keywords, a brand offering the item, a manufacturer of the item, a type of the item, a price of the item, a quantity of the item, a size of the item, a weight of the item, and other descriptive information of the item.

Additionally, one or more item attributes may be determined by the online concierge system 140 for an item based on information from the retailer and stored in an entry of the catalog for the item by the online concierge system 140. Example item attributes specified by the online concierge system 140 for an item include: a category for the item, one or more sub-categories for the item, and any other suitable information for the item. For example, the category and one or more sub-categories for an item are based on a taxonomy maintained by the online concierge system 140.

When the online concierge system 140 compensates a picker for fulfilling an order, the online concierge system 140 accounts for one or more item attributes of items included in the order. In various embodiments, the online concierge system 140 accounts for an aggregate weight of items in an order when determining compensation for a picker who fulfills the order. For example, the online concierge system 140 maintains a threshold weight (e.g., eight pounds) and compares an item's weight to the threshold weight. In various embodiments, the threshold weight is specified by the online concierge system 140 and stored in the data store 240 of the online concierge system 140. The online concierge system 140 classifies an item with a weight less than the threshold weight as light and classifies an item with a weight equal to or greater than (or greater than) the threshold weight as heavy. For items classified as heavy, the online concierge system 140 increases an amount of compensation to a picker relative to items classified as light. For example, the online concierge system 140 determines compensation to a picker as a percentage of a weight of an item classified as heavy or determines compensation to a picker as a percentage of an aggregate weight of items classified as heavy that are included in an order. In various embodiments, the percentage of the weight of items classified as heavy is greater than a percentage of the weight of items classified as light. Alternatively, the online concierge system 140 provides a picker with a fixed or specific amount of compensation for items classified as light, with additional compensation provided to the picker based on weights of items that have weights equaling or exceeding the threshold weight.

As pickers fulfill orders from retailers, the online concierge system 140 does not physically possess items included in orders, so the online concierge system 140 leverages a catalog obtained 305 from a retailer to determine item attributes of items in an order. For example, the online concierge system 140 is unable to weigh items to determine weights of different items, but instead uses information in a catalog from a retailer for different items to determine weights of items included in an order to be fulfilled from a retailer. Thus, the online concierge system 140 uses data in the catalog obtained 305 from a retailer to determine how to compensate a picker. However, the catalog obtained 305 for the retailer may not include weights for one or more items or may include inaccurate weights for one or more items. Without accurate weights for items, the online concierge system 140 may inaccurately determine compensation for a picker fulfilling an order. For example, the catalog for the retailer includes a weight for an item causing classification as a light item, while an actual weight of the item exceeds the threshold weight, so the picker is under-compensated, decreasing a likelihood of the picker fulfilling additional orders. Conversely, the catalog for the retailer includes a weight for an item causing classification as a heavy item, while the actual weight of the item is less than the threshold weight, so the picker is over-compensated, increasing an overall cost incurred by the online concierge system 140 for order fulfillment.

To account for discrepancies between a weight of an item included in a catalog and a physical weight of an item, the online concierge system 140 generates 310 a training dataset for a weight prediction model. The training dataset includes multiple training examples based on item attributes of items included in catalogs for one or more retailers. In various embodiments, each training example includes a training item for which a catalog for at least one retailer includes a weight for the item. Each training example includes a set of item attributes for the training item. For example, a training example includes a price of the training item, a volume of the training item, one or more categories associated with the training item by the online concierge system 140, and a quantity of the training item. In other embodiments, a training example includes additional item attributes of the training item than those described above, such as a brand associated with the training item or other item attributes describing the training item. A label indicating whether a weight of the training item is less than the threshold weight is applied to each training example. In various embodiments, the online concierge system 140 determines the label for a training example based on a comparison of the weight of the training item in the training example from a catalog to the threshold weight. For example, the label has a first value in response to the weight of the training item from the catalog equaling or exceeding the threshold weight and has a second value in response to the weight of the training item from the catalog being less than the threshold weight.

The weight prediction model comprises a set of weights stored on a non-transitory computer readable storage medium in various embodiments. With the training dataset generated 310, the online concierge system 140 initializes a network of a plurality of layers comprising the weight prediction model, with each layer including one or more weights. Different weights are applied to different item attributes of the item in various embodiments. The weight prediction model receives a combination of item attributes and determines a classification indicating whether weight of the item is less than the threshold weight. In various embodiments, the output of the weight prediction model has the first value in response to the weight prediction model determining a weight of the item equals or exceeds the threshold weight and has a second value in response to the weight prediction model determining the weight of the item being less than the threshold weight Hence, the weights comprise a set of parameters used by the weight prediction model to transform the input data—the item attributes of the item—received by the churn prediction model into output data—the classification indicating whether the weight of the item is less than the threshold weight.

After initializing the set of weights comprising the weight prediction model, the online concierge system 140 trains the weight prediction model by applying 315 the weight prediction model to multiple training examples of the training dataset. Application of the weight prediction model to training examples of the training dataset generates parameters (e.g., the weights) comprising the weight prediction model. As further described above, a training example includes a set of item attributes for a training item. A label applied to the training example indicates whether the weight of the training item included in the training example equals or exceeds the threshold weight. Applying the weight prediction model to a training example generates a predicted classification whether the weight of the training item is less than the threshold weight based on the set of item attributes in the training example.

For each training example to which the weight prediction model is applied 315, the online concierge system 140 generates a score comprising an error term based on the predicted classification whether the weight of the training item is less than the threshold weight based on the set of item attributes in a training example and the label applied to the training example. The error term is larger when a difference between the predicted classification whether the weight of the training item is less than the threshold weight based on the set of item attributes and the label applied to the training example is larger and is smaller when the difference between the predicted classification whether the weight of the training item is less than the threshold weight based on the set of item attributes and the label applied to the training example is smaller. In various embodiments, the online concierge system 140 generates the error term using a loss function based on a difference between the predicted classification whether the weight of the training item is less than the threshold weight based on the set of item attributes and the label applied to the training example using a loss function. Example loss functions include a mean square error function, a mean absolute error, a hinge loss function, and a cross-entropy loss function.

The online concierge system 140 backpropagates the error term to update the set of parameters comprising the weight prediction model and stops backpropagation in response to the error term, or to the loss function, satisfying one or more criteria. For example, the online concierge system 140 backpropagates the error term through the weight prediction model to update parameters of the weight prediction model until the error term has less than a threshold value. For example, the online concierge system 140 may apply gradient descent to update the set of parameters. The online concierge system 140 stores the set of parameters comprising the weight prediction model on a non-transitory computer readable storage medium after stopping the backpropagation.

Alternatively, the weight prediction model outputs a predicted weight of an item based on the set of attributes of the item received as input. In such embodiments, the training dataset includes multiple training examples that each comprise a set of item attributes of a training item, as further described above, with a label applied to a training example indicating a weight of the training item. The weight of the training item included in a label of a training example is determined from a catalog for a retailer in various embodiments.

As further described above, the weight prediction model is trained by initializing parameters comprising the weight prediction model and subsequently applying 315 the weight prediction model to multiple training examples, with application of the weight prediction model to a training example generating a predicted weight for a training item of the training example. As further described above, the online concierge system 140 generates a score for application of the weight prediction model to each training example. The score comprises an error term based on the predicted weight of the training item based on the item attributes in a training example and the label applied to the training example. The error term is larger when a difference between the predicted weight of the training item and the label applied to the training example is larger and is smaller when the difference between the predicted weight of the training item and the label applied to the training example is smaller. In various embodiments, the online concierge system 140 generates the error term using a loss function based on a difference between the predicted weight of the training item and the label applied to the training example using a loss function. The online concierge system 140 backpropagates the error term to update the set of parameters comprising the weight prediction model and stops backpropagation in response to the error term, or to the loss function, satisfying one or more criteria, as further described above.

The online concierge system 140 stores 320 the weight prediction model after application to multiple training examples of the training dataset. Training the weight prediction model based on items having a weight specified in one or more catalogs allows the weight prediction model to learn relationships between weights and different item attributes. For example, leveraging weights specified in one or more catalogs for items trains the weight prediction model so weights predicted by the weight prediction model are consistent with different combinations of a price of the item, a volume of the item, one or more categories associated with the item by the online concierge system 140, a quantity of the item, and a brand associated with the item.

With the weight prediction model trained and stored 320, the online concierge system 140 receives 325 an order from a customer. The order identifies a retailer and includes one or more items to be obtained from the identified retailer. In various embodiments, the order also includes a location where the items are to be delivered and a time interval for delivering the items to the customer. Additional or alternative information may be included in an order in various embodiments. For example, the customer selects one or more items for an order, as well as other information describing the order, through one or more ordering interfaces displayed on a customer client device 100, and the online concierge system 140 receives 325 the order based on the information obtained via the one or more ordering interfaces.

In response to receiving 325 the order, the online concierge system 140 applies 330 the trained weight prediction model to each item included in the order. By applying 330 the trained weight prediction model to each item in the order, the online concierge system 140 classifies each item in the order as heavy or light based on the output of the trained weight prediction model. As further described above, an item is classified as heavy if a weight of the item equals or exceeds the threshold weight, while the item is classified as light if the weight of the item is less than the threshold weight. In embodiments where the trained weight prediction model outputs a classification whether the weight of the item equals or exceeds the threshold weight, the online concierge system 140 uses the output of the trained weight prediction model to determine whether different items are heavy or light. In embodiments where the trained weight prediction model outputs a predicted weight of an item, the online concierge system 140 compares the predicted weight of an item from the weight prediction model to the threshold weight to classify the item as heavy or light.

The online concierge system 140 determines an amount of compensation to a picker based on the output of the weight prediction model for each item included in the order. In various embodiments, the online concierge system 140 determines the amount of compensation to a picker by aggregating weights of products classified as heavy and determining a percentage of the aggregated weights as the amount of compensation to the picker. In embodiments where the trained weight prediction model outputs a classification whether the weight of an item equals or exceeds the threshold weight, the online concierge system 140 retrieves a weight of each item in the received order classified as having a weight that equals or exceeds the threshold weight from a catalog for the retailer and aggregates the retrieved weights to determine the amount of compensation to the picker. In embodiments where the trained weight prediction model outputs a predicted weight of an item, the online concierge system 140 aggregates predicted weights that equal or exceed the threshold weight and determines the amount of compensation as a percentage of the aggregated predicted weights.

In various embodiments, the online concierge system 140 also compares 335 the classification of an item included in an order by the trained weight prediction model to an additional classification based on comparing the weight of the item from the catalog to the threshold weight. In response to the classification by the trained weight prediction model differing from the additional classification, the online concierge system 140 stores 340 a flag for review of the attribute of the item in association with the item. For example, in response to the trained weight prediction model outputting a classification of an item as heavy while a weight of the item included in a catalog results in classifying the item as light, the online concierge system 140 stores 340 the flag in association with the item. Similarly, in response to the trained weight prediction model outputting a classification of an item as light while a weight of the item included in a catalog results in classifying the item as heavy, the online concierge system 140 stores 340 the flag in association with the item.

Subsequently, a reviewing user obtains additional information about the weight of the item in response to the flag being stored 340 in association with the item. For example, the reviewing user accesses one or more third party systems to obtain additional information about the weight of the item and may update the attribute specifying the weight of the item in the catalog based on the information from the one or more third party systems. Information about the item obtained from the one or more third party systems includes physical properties (e.g., density) of the item, and the online concierge system 140 determines a physical weight of the item from the one or more physical properties. As another example, a reviewing user obtains the item and manually determines the weight of the item, then updates the attribute specifying the weight of the item in the catalog based on the manual weighing.

As the online concierge system 140 determines an amount of compensation to a picker for fulfilling an order based in part on the combined weight of items in the order, comparing 335 the output of the trained weight prediction model for an item to a corresponding attribute of the item in a catalog allows the online concierge system 140 to obtain and to maintain more accurate information about weights of one or more items for subsequent use. The increased accuracy of item weights from manual review of weights of items for which the flag is stored 340 allows compensation by the online concierge system 140 to a picker to more accurately reflect physical weights of items. Such improved accuracy reduces a likelihood of a picker being undercompensated for obtaining heavy items from inaccurate or incomplete information about items stored in a catalog and similarly reduces a likelihood of a picker being overcompensated for obtaining light items for which a catalog included inaccurate weights. More accurately determining compensation to pickers increases likelihoods of pickers fulfilling additional orders, while allowing the online concierge system 140 to optimize compensation to pickers fulfilling different orders.

Figure 4:
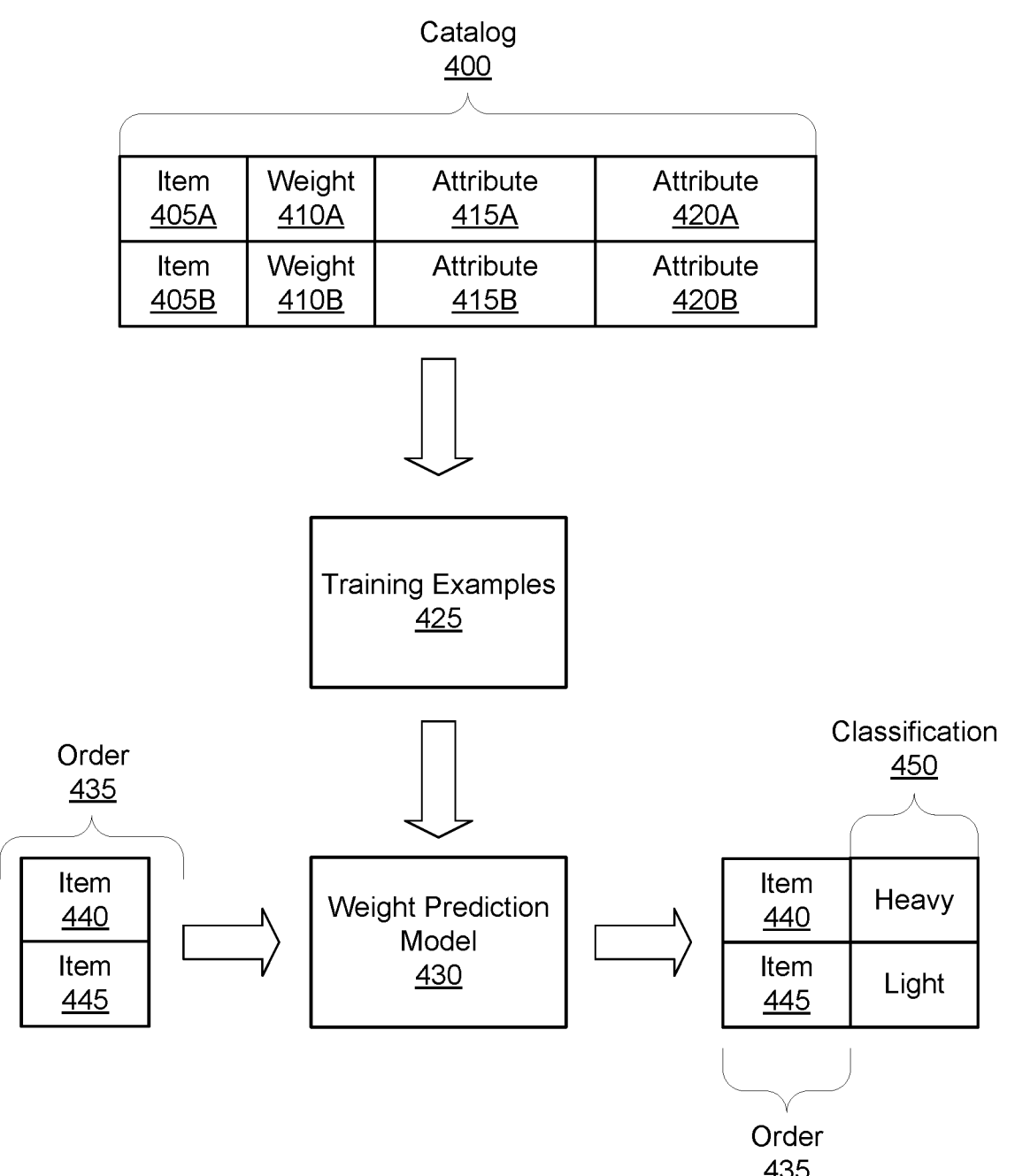
FIG. 4 is a process flow diagram of a method for classifying a weight of an item offered by a retailer through a trained weight prediction model, in accordance with one or more embodiments.

FIG. 4 is a process flow diagram of a method for classifying a weight of an item offered by a retailer through a trained weight prediction model. The online concierge system 140 obtains a catalog 400 from a retailer. As further described above in conjunction with FIG. 3, the catalog 400 includes multiple entries, with each entry corresponding to a different item. An entry in the catalog includes an item identifier of the item and one or more item attributes of the item. Example item attributes of an item include: one or more keywords, a brand offering the item, a manufacturer of the item, a type of the item, a price of the item, a quantity of the item, a size of the item, a weight of the item, and other descriptive information of the item. As further described above in conjunction with FIG. 3, in various embodiments, one or more attributes of an item are determined by the online concierge system 140 and stored in an entry for the item. For example, the online concierge system 140 determines one or more categories or sub-categories for an item and stores the categories or sub-categories in an entry in the catalog 400 for the item. The category or sub-categories for an item may be determined from a taxonomy maintained by the online concierge system 140.

For purposes of illustration, FIG. 4 shows example entries in the catalog 400 for item 405A and for item 405B. In the example of FIG. 4, the catalog 400 includes weight 410A, item attribute 415A, and item attribute 420A in association with item 405A. Similarly, the catalog 400 in FIG. 4 includes weight 410B, item attribute 415B, and item attribute 420B in association with item 405B. In various embodiments, the catalog 400 may include different item attributes for different items, with each attribute corresponding to a field in an entry of the catalog 400 for an item. While FIG. 4 shows a catalog 400 for a single retailer for purposes of illustration, the online concierge system 140 obtains catalogs for multiple retailers to maintain attributes of items offered by different retailers.

The online concierge system 140 receives orders from customers and allocates the orders to one or more pickers for fulfillment. Each order includes one or more items and identifies a retailer from which the items are to be obtained. A picker selects an order for fulfillment, obtains items included in the order from the retailer identified by the order, and delivers the obtained items to a location specified by the selected order to fulfill the selected order. The online concierge system 140 compensates a picker for fulfilling an order, with weights of items included in the order affecting an amount of compensation received by the picker. For example, the online concierge system 140 determines an aggregate weight of items, or of a subset of items, included in an order and determines the amount of compensation to a picker based on the aggregate weight.

In some embodiments, the online concierge system 140 maintains a threshold weight and compares an item's weight from the catalog 400 to the threshold weight. The online concierge system 140 classifies an item with a weight less than the threshold weight as light and classifies an item with a weight greater than (or equal to or greater than) the threshold weight as heavy. For items classified as heavy, the online concierge system 140 increases an amount of compensation to a picker relative to items classified as light. For example, the online concierge system 140 determines compensation to a picker as a percentage of an aggregate of items in an order classified as heavy. In various embodiments, the percentage of the weight of items classified as heavy is greater than a percentage of the weight of items classified as light.

However, pickers fulfill orders based on items available at a retailer identified in an order rather than from items maintained by the online concierge system 140. So, the online concierge system 140 does not physically possess items included in orders. Because the online concierge system 140 does not physically possess items, the online concierge system 140 leverages the catalog 400 obtained for a retailer to determine item attributes of various items, such as weights of items in an order to be fulfilled from the retailer. Hence, the online concierge system 140 conventionally retrieves weights of items in an order from the catalog 400 and uses the weight of an item in the catalog to determine whether items are heavy or light when determining compensation to a picker. However, the catalog 400 obtained for the retailer may not include weights for one or more items or may include inaccurate weights for one or more items. Inaccurate weights for items in the catalog 400 may cause the online concierge system 140 to inaccurately determine compensation for a picker fulfilling an order. For example, the catalog 400 for the retailer includes a weight for an item causing classification as a light item, while an actual weight of the item exceeds the threshold weight, so a picker is undercompensated, which reduces a likelihood of the picker fulfilling additional orders. Conversely, the catalog 400 for the retailer includes a weight for an item causing classification as a heavy item, while the actual weight of the item is less than the threshold weight, so a picker is overcompensated, which increases an overall cost incurred by the online concierge system 140 for order fulfillment.

To mitigate discrepancies between a weight of an item included in the catalog 400 and a physical weight of an item, the online concierge system 140 generates training examples 425 from the catalog 400. As further described above in conjunction with FIG. 3, each training example 425 corresponds to a training item for which the catalog 400 includes a weight. A training example 425 includes a set of item attributes of a training item from the catalog 400, with a label applied to the training example 425. In some embodiments, the label applied to a training example indicates whether a weight of the item from the catalog 400 is less than a threshold weight, so the label has a first value if the weight of the training item from the catalog 400 equals or exceeds the threshold weight and has a second, different, value if the weight of the training item from the catalog 400 is less than the threshold weight. Alternatively, the label applied to a training example 425 is a weight of the item determined from the catalog 400. For example, a training example 425 corresponding to item 405A includes item attribute 415A and item attribute 415B, with a label applied to the training example 425 indicating whether weight 410A is less than the threshold weight. In various embodiments, the online concierge system 140 generates training examples 425 from entries in catalogs 400 for multiple retailers. For example, the online concierge system 140 generates a training example 425 for each item having a weight stored in at least one catalog 400.

The online concierge system 140 applies a weight prediction model 430 to each of a set of training examples 425 to train the weight prediction model 430. In some embodiments, the online concierge system 140 applies the weight prediction model 430 to each generated training example 425. As further described above in conjunction with FIG. 3, applying the weight prediction model 430 to training examples 425 allows the online concierge system 140 to modify one or more parameters comprising the weight prediction model 430, such as weights comprising the weight prediction model 430, through an iterative process. After application to training examples 425, the weight prediction module 430 outputs a classification whether a weight of an item is less than the threshold weight based on a set of item attributes of the item in some embodiments. Alternatively, after training, the weight prediction model 430 outputs a predicted weight of an item based on a set of item attributes of the item. Training the weight prediction model 430 using items with a weight stored in one or more catalogs 400 allows the weight prediction model 430 to predict weights based on various combinations of item attributes so a predicted weight accounts for similarities between item attributes of different items. After training, the online concierge system 140 stores the trained weight prediction model 430 for subsequent application to item attributes.

After storing the trained weight prediction model 430, the online concierge system 140 receives an order 435 from a customer. In the example of FIG. 4, the order 435 includes two items—item 440 and item 445. However, the order 435 may include any number of items. To determine compensation for a picker fulfilling the order 435, the online concierge system 140 applies the trained weight prediction model 430 to each item included in the order 435. Based on the output of the trained weight prediction model 430 for each item included in the order 435, the online concierge system 140 determines an amount of compensation for the picker fulfilling the order 435.

In the example of FIG. 4, the trained weight prediction model 430 outputs a classification 450 for each item in the order 435, with the classification 450 indicating whether an item is heavy (i.e., has a weight equaling or exceeding the threshold weight) or is light (i.e., has a weight less than the threshold weight). For purposes of illustration, FIG. 4 shows an example where item 440 has a classification 450 of heavy, while item 445 has a classification 450 of light. The online concierge system 140 determines the amount of compensation for a picker as a percentage of the weight of item 440, which was classified as having a weight equaling or exceeding the threshold weight in various embodiments. In some embodiments, the online concierge system 140 aggregates weights of each item classified as having a weight equaling or exceeding the threshold weight and determines compensation to the picker as a percentage of the aggregated weights, as further described above in conjunction with FIG. 3.

Additionally, the online concierge system 140 compares a classification of an item in the order 435 to an additional classification of the item from a weight stored for the item in the catalog 400. In response to the classification of the item in the order 435 differing from the classification of the item from a weight stored for the item in the catalog 400, the online concierge system 140 stores a flag in association with the item. For an item for which a flag was stored, a reviewing user of the online concierge system 140 obtains additional information about the item to resolve the difference in classification from the trained weight prediction model 430 and the additional comparison based on the data in the catalog 400. As further described above in conjunction with FIG. 3, the reviewing user accesses one or more third party systems to obtain additional information about the weight of the item and may update the attribute specifying the weight of the item in the catalog based on the information from the one or more third party systems. For example, the reviewing user obtains one or more physical properties, such as density, of the item and determines a weight of the item from the one or more physical properties. As another example, a reviewing user obtains the item and manually determines the weight of the item, then updates the attribute specifying the weight of the item in the catalog based on the manual weighing. Storing a flag in association with an item for which the trained weight prediction model 430 outputs a different classification than an additional classification from a weight of the item in the catalog 400 allows the online concierge system 140 to update the catalog 400 with a more accurate weight of the item (or to further refine the weight prediction model 430). Improving an accuracy of weights stored form various items allows the online concierge system 140 to more accurately determine compensation to a picker for additional orders including the item, increasing a likelihood of the picker fulfilling subsequent orders while preventing overcompensation of pickers for obtaining the item.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
obtaining a catalog of items from a retailer, the catalog including each item offered by the retailer and including one or more item attributes associated with each item;
receiving an order for fulfillment, the order including one or more items and identifying the retailer from which the one or more items are to be obtained;
for each item of the order, determining a classification indicating whether a weight of the item is less than a threshold weight by applying a weight prediction model to a set of item attributes of the item, the weight prediction model trained by:
obtaining a training dataset including a plurality of training examples, each training example including a set of item attributes of a training item and each training example having a label indicating whether a weight of the training item is less than a threshold weight;
applying the weight prediction model to each training example of the training dataset to generate a classification whether the weight of the training item of a training example is less than the threshold weight;
scoring the weight prediction model using a loss function based on the classification of the training item and the label of the training example;
updating one or more parameters of the weight prediction model by backpropagation based on the scoring until one or more criteria are satisfied;
comparing the classification from the weight prediction model with a classification of the item based on a weight stored in the catalog; and
in response to a difference between the classification from the weight prediction model and the classification based on the weight stored in the catalog,
storing a flag in association with the item;
transmitting an instruction to a picker client device, causing the picker client device to obtain a weight measurement of the item determined by a weighing sensor;
receiving a weight measurement of the item from the picker client device; and
updating the catalog of items with the weight measurement of the item;
generating additional training examples for the weight prediction model based on flagged items by:
associating the weight measurements with corresponding item attributes of the flagged items; and
retraining the weight prediction model using the additional training examples by updating the parameters of the weight prediction model based on the additional training examples; and
communicating, to a device associated with a picker fulfilling the order, an amount of compensation for fulfilling the order, wherein the amount is determined based on the classifications from the weight prediction model for each item of the order.

2. The method of claim 1, further comprising:

comparing a classification whether the weight of a specific item of the order is less than a threshold weight from application of the weight prediction model to the set of attributes of the specific item to an additional classification whether the weight of the specific item of the order is less than the threshold weight from a weight stored in the catalog in association with the specific item; and storing a flag in association with the specific item in response to the classification whether the weight of a specific item of the order is less than a threshold weight from application of the weight prediction model to the set of attributes of the specific item differing from the additional classification whether the weight of the specific item of the order is less than the threshold weight from the weight stored in the catalog in association with the specific item.

3. The method of claim 2, further comprising:

obtaining additional information about the specific item; and updating the weight stored in the catalog in association with the specific item based on the additional information about the specific item.

4. The method of claim 3, wherein the additional information about the specific item is obtained from one or more third party systems.

5. The method of claim 3, wherein the additional information about the specific item comprises one or more physical properties of the specific item.

6. The method of claim 3, wherein obtaining additional information about the specific item comprises:

obtaining the specific item; and physically weighing the specific item.

7. The method of claim 3, wherein the additional information about the specific item is obtained by a reviewing user of the computing system.

8. The method of claim 1, wherein the set of item attributes of the item comprises one or more selected from: a price of the item, a volume of the item, a quantity of the item, one or more categories associated with the item by the computing system, or a brand associated with the item.

9. The method of claim 1, wherein determining the amount of compensation to the picker fulfilling the order based on the classifications determined by the weight prediction model for each item of the order comprises determining the amount of compensation based on an aggregated weight of items classified as having a weight that equals or exceeds the threshold weight.

10. The method of claim 9, wherein determining the amount of compensation based on an aggregated weight of items classified as having the weight that equals or exceeds the threshold weight comprises determining the amount of compensation as a percentage of the aggregated weight.

11. A computer program product comprising a non-transitory computer readable storage medium having instructions encoded thereon that, when executed by a processor, cause the processor to perform steps comprising:

obtaining a catalog of items from a retailer, the catalog including each item offered by the retailer and including one or more item attributes associated with each item;

receiving an order for fulfillment, the order including one or more items and identifying the retailer from which the one or more items are to be obtained;

for each item of the order, determining a classification indicating whether a weight of the item is less than a threshold weight by applying a weight prediction model to a set of item attributes of the item, the weight prediction model trained by:

obtaining a training dataset including a plurality of training examples, each training example including a set of item attributes of a training item and each training example having a label indicating whether a weight of the training item is less than a threshold weight;

applying the weight prediction model to each training example of the training dataset to generate a classification whether the weight of the training item of a training example is less than the threshold weight;

scoring the weight prediction model using a loss function based on the classification of the training item and the label of the training example;

updating one or more parameters of the weight prediction model by backpropagation based on the scoring until one or more criteria are satisfied;

comparing the classification from the weight prediction model with a classification of the item based on a weight stored in the catalog; and in response to a difference between the classification from the weight prediction model and the classification based on the weight stored in the catalog, storing a flag in association with the item;

transmitting an instruction to a picker client device, causing the picker client device to obtain a weight measurement of the item determined by a weighing sensor;

receiving a weight measurement of the item from the picker client device; and updating the catalog of items with the weight measurement of the item;

generating additional training examples for the weight prediction model based on flagged items by:

associating the weight measurements with corresponding item attributes of the flagged items; and retraining the weight prediction model using the additional training examples by updating the parameters of the weight prediction model based on the additional training examples; and communicating, to a device associated with a picker fulfilling the order, an amount of compensation for fulfilling the order, wherein the amount is determined based on the classifications from the weight prediction model for each item of the order.

12. The computer program product of claim 11, wherein the non-transitory computer readable storage medium further has instructions encoded thereon that, when executed by the processor, cause the processor to perform steps comprising:

comparing a classification whether the weight of a specific item of the order is less than a threshold weight from application of the weight prediction model to the set of attributes of the specific item to an additional classification whether the weight of the specific item of the order is less than the threshold weight from a weight stored in the catalog in association with the specific item; and storing a flag in association with the specific item in response to the classification whether the weight of a specific item of the order is less than a threshold weight from application of the weight prediction model to the set of attributes of the specific item differing from the additional classification whether the weight of the specific item of the order is less than the threshold weight from the weight stored in the catalog in association with the specific item.

13. The computer program product of claim 12, wherein the non-transitory computer readable storage medium further has instructions encoded thereon that, when executed by the processor, cause the processor to perform steps comprising:

obtaining additional information about the specific item; and updating the weight stored in the catalog in association with the specific item based on the additional information about the specific item.

14. The computer program product of claim 13, wherein the additional information about the specific item is obtained from one or more third party systems.

15. The computer program product of claim 13, wherein obtaining additional information about the specific item comprises:

obtaining the specific item; and physically weighing the specific item.

16. The computer program product of claim 11, wherein the set of item attributes of the item comprises one or more of: a price of the item, a volume of the item, a quantity of the item, one or more categories associated with the item, or a brand associated with the item.

17. The computer program product of claim 11, wherein determining the amount of compensation to the picker fulfilling the order based on the classifications determined by the weight prediction model for each item of the order comprises determining the amount of compensation based on an aggregated weight of items classified as having a weight that equals or exceeds the threshold weight.

18. The computer program product of claim 17, wherein determining the amount of compensation based on an aggregated weight of items classified as having the weight that equals or exceeds the threshold weight comprises determining the amount of compensation as a percentage of the aggregated weight.

19. A system comprising:

a processor;

a non-transitory computer readable storage medium having instructions encoded thereon that, when executed by the processor, cause the processor to perform steps comprising:

obtaining a catalog of items from a retailer, the catalog including each item offered by the retailer and including one or more item attributes associated with each item;

receiving an order for fulfillment, the order including one or more items and identifying the retailer from which the one or more items are to be obtained;

for each item of the order, determining a classification indicating whether a weight of the item is less than a threshold weight by applying a weight prediction model to a set of item attributes of the item, the weight prediction model trained by:

obtaining a training dataset including a plurality of training examples, each training example including a set of item attributes of a training item and each training example having a label indicating whether a weight of the training item is less than a threshold weight;

applying the weight prediction model to each training example of the training dataset to generate a classification whether the weight of the training item of a training example is less than the threshold weight;

scoring the weight prediction model using a loss function based on the classification of the training item and the label of the training example;

updating one or more parameters of the weight prediction model by backpropagation based on the scoring until one or more criteria are satisfied;

comparing the classification from the weight prediction model with a classification of the item based on a weight stored in the catalog; and in response to a difference between the classification from the weight prediction model and the classification based on the weight stored in the catalog, storing a flag in association with the item;

transmitting an instruction to a picker client device, causing the picker client device to obtain a weight measurement of the item determined by a weighing sensor;

receiving a weight measurement of the item from the picker client device; and updating the catalog of items with the weight measurement of the item;

generating additional training examples for the weight prediction model based on flagged items by:

associating the weight measurements with corresponding item attributes of the flagged items; and retraining the weight prediction model using the additional training examples by updating the parameters of the weight prediction model based on the additional training examples; and communicating, to a device associated with a picker fulfilling the order, an amount of compensation for fulfilling the order, wherein the amount is determined based on the classifications from the weight prediction model for each item of the order.

20. The system of claim 19, wherein the non-transitory computer readable storage medium further has instructions encoded thereon that, when executed by the processor, cause the processor to perform steps comprising:

comparing a classification whether the weight of a specific item of the order is less than a threshold weight from application of the weight prediction model to the set of attributes of the specific item to an additional classification whether the weight of the specific item of the order is less than the threshold weight from a weight stored in the catalog in association with the specific item;

storing a flag in association with the specific item in response to the classification whether the weight of a specific item of the order is less than a threshold weight from application of the weight prediction model to the set of attributes of the specific item differing from the additional classification whether the weight of the specific item of the order is less than the threshold weight from the weight stored in the catalog in association with the specific item;

obtaining additional information about the specific item; and updating the weight stored in the catalog in association with the specific item based on the additional information about the specific item.

* * * * *